(12) United States Patent
Li et al.

(10) Patent No.: US 9,154,210 B2
(45) Date of Patent: Oct. 6, 2015

(54) DOWNLINK TRANSMISSION METHOD FOR MULTIPLE INPUT MULTIPLE OUTPUT (MIMO) SYSTEM, AND BASE STATION

(75) Inventors: Bin Li, Shenzhen (CN); Jinfeng Yan, Shenzhen (CN); Chenhong Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 316 days.

(21) Appl. No.: 13/696,975

(22) PCT Filed: Nov. 1, 2010

(86) PCT No.: PCT/CN2010/078300
§ 371 (c)(1),
(2), (4) Date: Nov. 8, 2012

(87) PCT Pub. No.: WO2011/140788
PCT Pub. Date: Nov. 17, 2011

(65) Prior Publication Data
US 2013/0058246 A1    Mar. 7, 2013

(30) Foreign Application Priority Data
May 11, 2010    (CN) .......................... 2010 1 0178244

(51) Int. Cl.
*H04B 7/06*    (2006.01)
*H04B 7/04*    (2006.01)

(52) U.S. Cl.
CPC .............. *H04B 7/063* (2013.01); *H04B 7/0628* (2013.01); *H04B 7/0632* (2013.01); *H04B 7/0639* (2013.01); *H04B 7/0689* (2013.01); *H04B 7/0452* (2013.01)

(58) Field of Classification Search
None
See application file for complete search history.

(56) References Cited

U.S. PATENT DOCUMENTS

| | | | |
|---|---|---|---|
| 2009/0086648 A1* | 4/2009 | Xu et al. | 370/252 |
| 2009/0190528 A1 | 7/2009 | Chung | |
| 2009/0245408 A1* | 10/2009 | Mujtaba et al. | 375/267 |
| 2010/0075672 A1 | 3/2010 | Jwa | |
| 2010/0238824 A1* | 9/2010 | Farajidana et al. | 370/252 |
| 2010/0272018 A1* | 10/2010 | Furueda et al. | 370/328 |
| 2011/0019613 A1* | 1/2011 | Han et al. | 370/328 |
| 2011/0142144 A1* | 6/2011 | Allpress et al. | 375/259 |
| 2012/0051257 A1* | 3/2012 | Kim et al. | 370/252 |
| 2012/0225625 A1* | 9/2012 | Asplund et al. | 455/77 |

FOREIGN PATENT DOCUMENTS

| | | |
|---|---|---|
| CN | 1946000 A | 4/2007 |
| CN | 101610527 A | 12/2009 |
| CN | 101631355 A | 1/2010 |

OTHER PUBLICATIONS

International Search Report for International Application No. PCT/CN2010/078300 dated Jan. 20, 2011.

* cited by examiner

*Primary Examiner* — Ayaz Sheikh
*Assistant Examiner* — Mariela Vidal Carpio
(74) *Attorney, Agent, or Firm* — Jenkins, Wilson, Taylor & Hunt, P.A.

(57) ABSTRACT

The disclosure provides a downlink transmission method for a Multiple Input Multiple Output (MIMO) system, and a base station, wherein the method comprises: a base station selecting a downlink MIMO mode in a downlink transmission mode in which a UE currently is by using a Channel Quality Indicator (CQI), a Rank Indicator (RI) and a Preceding Matrix Indicator (PMI) which are reported by the UE within a time window; and the base station transmitting data to the UE by using the selected downlink MIMO mode. The disclosure achieves the effect of increasing the coverage and capacity of the LTE system to the maximum.

7 Claims, 2 Drawing Sheets

A base station selects one downlink MIMO mode in a downlink transmission mode in which a UE currently is by using a CQI, an RI and a PMI which are reported by the UE within a time window — S102

The base station transmits data to the UE by using the selected downlink MIMO mode — S104

DOWNLINK TRANSMISSION METHOD FOR MULTIPLE INPUT MULTIPLE OUTPUT (MIMO) SYSTEM, AND BASE STATION

FIELD OF THE INVENTION

The disclosure relates to the field of communications, and in particular to a downlink transmission method for a Multiple Input Multiple Output system (MIMO), and a base station.

BACKGROUND OF THE INVENTION

A Long Term Evolution (LTE) wireless communication system is a new generation of wireless network system based on an Orthogonal Frequency Division Multiplexing (OFDM) technology. A wireless side of the LTE wireless communication system adopts techniques such as MIMO, high-order modulation and corresponding frequency selection scheduling, and power control to cooperate so as to realize higher system throughput and frequency spectrum efficiency.

In the LTE system, the MIMO is considered as the best technique for meeting the requirements of the average throughput of users and the frequency spectrum efficiency. In order to achieve this object, it is regulated that, in the LTE system, a plurality of MIMO techniques comprising solutions such as linear spatial-domain precoding, beam forming and transmission diversity can be selected and adopted adaptively in different wireless channel environments.

The linear spatial-domain precoding method refers that, when a transmitting terminal has a plurality of transmitting antennas, a plurality of data streams can be mapped to the plurality of transmitting antennas through a linear precoding process. User Equipment (UE) generates a precoding vector according to an estimation of downlink spatial channel characteristics and feeds back the precoding vector to an eNodeB side by using an uplink control channel. The principle mainly lies in that a transmitted signal is enabled to be on a corresponding orthogonal basis of a channel matrix through a precoding matrix, and the main working mechanism lies in that different data streams are transmitted on a plurality of independent spatial channels and thus the peak rate of data transmission is improved.

For the precoding method with Rank=1, provided the number of antennas is N, when the number of data streams is 1, that is, one data stream is mapped to N antennas, this linear precoding in the spatial domain also can be regarded as a conventional beam forming method. The main principle of the beam forming technique is to generate a strong directional radiation pattern using the strong correlation of spatial channels and the interference principle of waves, and to make the main lobe of the radiation pattern adaptively point to the direction of an arrival wave of the user so as to enhance a Signal to Noise Ratio (SNR), and to enhance system capacity or coverage. The difference between the precoding technique with Rank=1 and the beam forming technique only lies in that, in the former one, the UE generates a precoding vector according to an estimation of downlink spatial channel characteristics and feeds back the precoding vector to an eNodeB side using an uplink control channel. Just to consider the problem of quantization of feedback information, the LTE protocol regulates a feedback weight list in double-antenna and four-antenna patterns, and a Precoding Matrix Indicator (PMI) actually fed back by the UE side is the index of weight.

The main principle of the transmission diversity is to improve the reliability of signal transmission based on a diversity gain by using week correlation of spatial channels in conjunction with time/frequency selectivity and thus to improve the SNR of received signals.

The LTE protocol regulates multiple downlink transmission modes, each of which can support a plurality of MIMO techniques comprising precoding based space multiplexing, precoding with Rank=1 and transmission diversity. Considering that multiple downlink MIMO techniques above exist in each downlink transmission mode and each downlink MIMO technique has pertinence, in the existing LTE system, when the wireless environment changes, the downlink MIMO transmission technique can not be adjusted in real time and the resource utilization ratio is low.

SUMMARY OF THE INVENTION

The disclosure provides a downlink transmission method for an MIMO system and a base station, which at least solve the problem above.

According to one aspect of the disclosure, a downlink transmission method for an MIMO system is provided, which comprises: a base station selecting one downlink MIMO mode in a downlink transmission mode in which a UE currently is by using a Channel Quality Indicator (CQI), a Rank Indicator (RI) and a Preceding Matrix Indicator (PMI) which are reported by the UE within a time window; and the base station transmitting data to the UE by using the selected downlink MIMO mode.

Preferably, the step of the base station selecting the downlink MIMO mode in the downlink transmission mode in which the UE currently is by using the CQI, the RI and the PMI which are reported by the UE within the time window comprises: calculating a channel Signal Interference Noise Ratio (SINR) parameter of the UE by using the CQI which is reported by the UE within the time window; calculating a channel correlation parameter of the UE by using the RI which is reported by the UE within the time window; calculating a channel variation state parameter of the UE by using the PMI which is reported by the UE within the time window; and determining the downlink MIMO mode in the downlink transmission mode in which the UE currently is according to the channel SINR parameter, the channel correlation parameter and the channel variation state parameter of the UE.

Preferably, the step of calculating the channel SINR parameter of the UE by using the CQI which is reported by the UE within the time window comprises:

$$flag^{CQI} = \begin{cases} \text{a first value,} & CQI > CQI\_Thr \\ \text{a second value,} & CQI \le CQI\_Thr, \end{cases}$$

wherein $flag^{CQI}$ is the channel SINR parameter of the UE, CQI_Thr is a decision threshold of the CQI and CQI is a mean value of CQIs reported last M times by the UE within the time window, M is a constant, $$CQI = E\left\{ \min_{1 \le m \le M} (CQI_1(m), CQI_2(m)) \right\},$$

m is a variable, $CQI_1(m)$ is a CQI value of a single flow or the first flow of two flows and $CQI_2(m)$ is a CQI value of the second flow of the two flows, if the CQI reported the $m^{th}$ time by the UE is a single-flow CQI, $CQI_2(m)=16$.

Preferably, the step of calculating the channel correlation parameter of the UE by using the RI which is reported by the UE within the time window comprises:

$$flag^{RI} = \begin{cases} \text{a third value,} & P_{RI=1} > RI\_Thr \\ \text{a fourth value,} & P_{RI \geq 2} \leq RI\_Thr \\ \text{a fifth value,} & \text{others,} \end{cases}$$

wherein $flag^{RI}$ is the channel correlation parameter of the UE, $P_{RI=1}$ is a probability of RI=1 reported by the UE within the time window, $P_{RI \geq 2}$ is a probability of RI≥2 reported by the UE within the time window and RI_Thr is a decision threshold of the RI.

Preferably, if the UE does not report the RI, the channel correlation parameter of the UE is 0.

Preferably, the step of calculating the channel variation state parameter of the UE by using the PMI which is reported by the UE within the time window comprises:

$$flag^{PMI} = \begin{cases} \text{a seventh value,} & P_{PMI} \leq PMI\_Thr \\ \text{an eighth value,} & \text{others,} \end{cases}$$

wherein $flag^{PMI}$ is the channel variation state parameter of the UE, $P_{PMI}$ is a probability that two PMI values reported continuously by the UE within the time window are different and PMI_Thr is a decision threshold of channel variation characteristics.

Preferably, if the UE does not report the PMI, the channel variation state parameter of the UE is 0.

Preferably, the step of determining the downlink MIMO mode in the downlink transmission mode in which the UE currently is according to the channel SINR parameter, the channel correlation parameter and the channel variation state parameter of the UE comprises: if a value of the channel SINR parameter is a first value, a value of the channel correlation parameter is a fourth value and a value of the channel variation state parameter is a seventh value, and the UE is in a downlink transmission mode 4 currently, selecting a precoding based closed-loop space multiplexing technique as the downlink MIMO mode; if the value of the channel SINR parameter is the first value, the value of the channel correlation parameter is the fourth value and the value of the channel variation state parameter is an eighth value, and the UE is in a downlink transmission mode 3 currently, selecting a precoding based open-loop space multiplexing technique as the downlink MIMO mode; if the value of the channel correlation parameter is a third value and the value of the channel variation state parameter is the seventh value, and the UE is in a downlink transmission mode 4 or 6 currently, selecting a layer=1 closed-loop precoding technique as the downlink MIMO mode; if the value of the channel correlation parameter is the third value and the value of the channel variation state parameter is the seventh value, and the UE is in a downlink transmission mode 7 currently, selecting a beam-forming technique as the downlink MIMO mode; otherwise, selecting a transmission diversity technique in the downlink transmission mode in which the UE currently is as the downlink MIMO mode.

According to another aspect of the disclosure, a base station is provided, which comprises: a selection module, which is configured to select one downlink MIMO mode in a downlink transmission mode in which a UE currently is by using a CQI, an RI and a PMI which are reported by the UE within a time window; and a transmission module, which is configured to transmit data to the UE by using the selected downlink MIMO mode.

Preferably, the selection module comprises: a first calculation module, which is configured to calculate a channel SINR parameter of the UE by using the CQI that is reported by the UE within the time window; a second calculation module, which is configured to calculate a channel correlation parameter of the UE by using the RI that is reported by the UE within the time window; a third calculation module, which is configured to calculate a channel variation state parameter of the UE by using the PMI that is reported by the UE within the time window; and a determination module, which is configured to determine the downlink MIMO mode in the downlink transmission mode in which the UE currently is according to the channel SINR parameter, the channel correlation parameter and the channel variation state parameter of the UE.

With the disclosure, the CQI, the RI and the PMI which are reported by the UE are taken as the basis for the base station to select in the downlink transmission mode a proper MIMO technique for the UE to carry out data transmission, a proper downlink MIMO technique in the downlink transmission mode can be adaptively configured for the UE according to the location and the wireless channel scenarios of the UE in the LTE communication system, so as to further develop the advantages of the multi-antenna technique. In this way, the LTE wireless communication system can make full use of different characteristics and applicable scenarios of each MIMO technique to achieve the effect of increasing the coverage and capacity of the LTE system to the maximum.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The disclosure is described below in detail by reference to the accompanying drawings in conjunction with embodiments. It should be noted that the embodiments in the application and the characteristics of the embodiments can be combined if no conflict is caused.

An LTE system comprises a base station (eNodeB) and a UE, wherein the eNodeB transmits data of the UE by adopting different downlink transmission modes, and each downlink transmission mode supports a plurality of MIMO techniques. The embodiments of the disclosure described hereinafter are implemented in an OFDM based LTE system.

Figure 1:
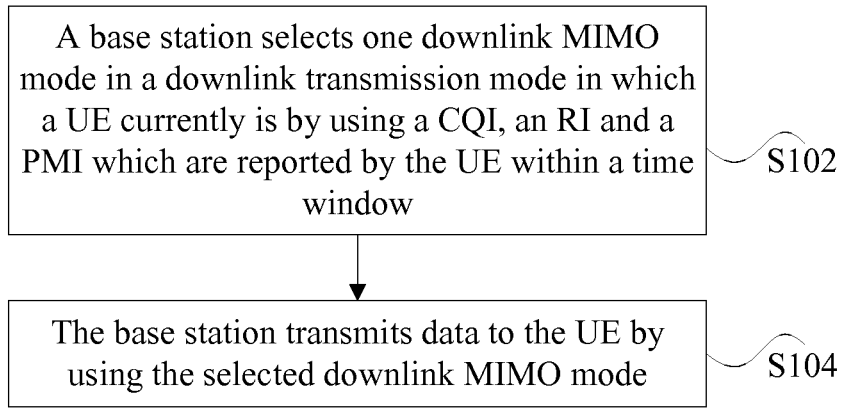
FIG. 1 shows a flowchart of a downlink transmission method for an MIMO system according to an embodiment of the disclosure.

FIG. 1 shows a flowchart of a downlink transmission method for an MIMO system according to an embodiment of the disclosure, which comprises the following steps.

Step 102: a base station selects one downlink MIMO mode in a downlink transmission mode in which a UE currently is by using a CQI, an RI and a PMI which are reported by the UE within a time window.

For example, in the LTE system, the LTE protocol regulates that the downlink transmission mode comprises MIMO techniques (that is, MIMO modes) such as precoding based spatial multiplexing, Rank=1 precoding (that is, layer=1 precoding) and transmission diversity. In addition, the LTE protocol also regulates that, in part downlink transmission modes, each UE feeds back and reports CQI/RI/PMI information to the eNodeB, thus the determination of the selection method of the MIMO mode in the downlink transmission mode can be accomplished based on the above information.

Step 104: the base station transmits data to the UE by using the selected downlink MIMO mode.

For example, through Step 102, after a proper MIMO technique is selected for the UE from multiple MIMO techniques which are supported by the downlink transmission mode corresponding to the UE, the base station transmits the data of the UE by using the selected MIMO technique, so that the capacity of the LTE system can be increased to the maximum whatever channel state the UE is in.

In this embodiment, a method for realizing adaptive selection in the downlink transmission mode is provided, wherein the CQI, the RI and the PMI which are reported by the UE are taken as the basis for the base station to select in the downlink transmission mode a proper MIMO technique for the UE to carry out data transmission. By virtue of the method, a proper downlink MIMO technique in the downlink transmission mode can be adaptively configured for the UE according to the location and the wireless channel scenarios of the UE in the LTE communication system, so as to further develop the advantages of a multi-antenna technique. In this way, the LTE wireless communication system can make full use of different characteristics and applicable scenarios of each downlink MIMO technique to achieve the effect of increasing the coverage and capacity of the LTE system to the maximum. The above method can be applied to the LTE system.

In addition, compared with inter-downlink transmission mode handover, intra-downlink transmission mode handover (when a second MIMO technique which is different from a first MIMO technique in the currently used downlink transmission mode is selected in the downlink transmission mode for the UE through Step 102, the base station switches the MIMO mode, which is used to transmit data by the base station to the UE, from the first MIMO technique to the second MIMO technique) can be completed through a Media Access Control (MAC) signalling, thus handover delay is greatly shortened and an adaptive algorithm suits the change of wireless channels more quickly.

Preferably, Step 102 comprises the following Steps 1 to 4:

Step 1: by using the CQI which is reported by the UE within the time window, a channel SINR parameter flag$^{CQI}$ of the UE is calculated according to the following formula:

$$flag^{CQI} = \begin{cases} \text{a first value,} & CQI > CQI\_Thr \\ \text{a second value,} & CQI \le CQI\_Thr, \end{cases}$$

wherein flag$^{CQI}$ is the channel SINR parameter of the UE, CQI_Thr is a decision threshold of the CQI and CQI is a mean value of CQIs reported last M times by the UE within the time window, M is a constant, $CQI=E\{\min_{1 \le m \le M}(CQI_1(m), CQI_2(m))\}$, m is a variable, $CQI_1(m)$ is a CQI value of a single flow or the first flow of two flows and $CQI_2(m)$ is a CQI value of the second flow of the two flows, if the CQI reported the m$^{th}$ time by the UE is a single-flow CQI, $CQI_2(m)=16$.

Step 2: by using the RI which is reported by the UE within the time window, a channel correlation parameter flag$^{RI}$ of the UE is calculated according to the following formula:

$$flag^{RI} = \begin{cases} \text{a third value,} & P_{RI=1} > RI\_Thr \\ \text{a fourth value,} & P_{RI \ge 2} > RI\_Thr \\ \text{a fifth value,} & \text{others,} \end{cases}$$

wherein flag$^{RI}$ is the channel correlation parameter of the UE, $P_{RI=1}$ is a probability of RI≥1 reported by the UE within the time window, $P_{RI \ge 2}$ is a probability of RI 2 reported by the UE within the time window and RI_Thr is a decision threshold of the RI.

In the step, if the UE does not report the RI, the channel correlation parameter of the UE is 0.

Step 3: by using the PMI which is reported by the UE within the time window, a channel variation state parameter flag$^{PMI}$ of the UE is calculated according to the following formula:

$$flag^{PMI} = \begin{cases} \text{a seventh value,} & P_{PMI} \le PMI\_Thr \\ \text{an eighth value,} & \text{others,} \end{cases}$$

wherein flag$^{PMI}$ is the channel variation state parameter of the UE, $P_{PMI}$ is a probability that two PMI values reported continuously by the UE within the time window are different and PMI_Thr is a decision threshold of channel variation characteristics.

In the step, if the UE does not report the PMI, the channel variation state parameter of the UE is 0.

The above Steps 1 to 3 can be called a decision algorithm for selecting a downlink MIMO technique for the UE by the base station.

Step 4: the selected downlink MIMO mode is determined in the downlink transmission mode in which the UE currently is according to the channel SINR parameter flag$^{CQI}$ the channel correlation parameter flag$^{RI}$ and the channel variation state parameter flag$^{PMI}$ of the UE (that is, one MIMO technique is selected from multiple MIMO techniques which are supported by the downlink transmission mode corresponding to the UE). The step comprises: if the value of the channel SINR parameter is the first value, the value of the channel correlation parameter is the fourth value and the value of the channel variation state parameter is the seventh value, and the UE is in a downlink transmission mode 4 currently, a precoding based closed-loop space multiplexing technique is selected as the downlink MIMO mode; if the value of the channel SINR parameter is the first value, the value of the channel correlation parameter is the fourth value and the value of the channel variation state parameter is the eighth value, and the UE is in a downlink transmission mode 3 currently, a precoding based open-loop space multiplexing technique is selected as the downlink MIMO mode; if the value of the channel correlation parameter is the third value and the value of the channel variation state parameter is the seventh value, and the UE is in a downlink transmission mode 4 or 6 currently, a layer=1 closed-loop precoding technique is selected as the downlink MIMO mode; if the value of the channel correlation parameter is the third value and the value of the channel variation state parameter is the seventh value, and the UE is in a downlink transmission mode 7 currently, a beam-forming technique is selected as the downlink MIMO mode; otherwise, a transmission diversity technique in the downlink transmission mode, in which the UE currently is, is selected as the downlink MIMO mode.

For example, in Step 4, when the downlink transmission mode, in which the UE currently is, is the downlink transmission mode 4, and when the downlink MIMO technique adopted by the base station to transmit the data of the UE currently is the precoding based closed-loop space multiplexing technique, if the MIMO technique selected for the UE according to the above Steps 1 to 4 is the layer=1 closed-loop precoding technique or the transmission diversity technique, then the base station switches the MIMO technique adopted to transmit the data of the UE to the layer=1 closed-loop precoding technique or the transmission diversity technique. When the downlink MIMO technique adopted by the base station to transmit the data of the UE currently is the layer=1 closed-loop precoding technique, if the MIMO technique selected for the UE according to the above Steps 1 to 4 is the precoding based closed-loop space multiplexing technique or the transmission diversity technique, then the base station switches the MIMO technique adopted to transmit the data of the UE to the precoding based closed-loop space multiplexing technique or the transmission diversity technique. When the downlink MIMO technique adopted by the base station to transmit the data of the UE currently is the transmission diversity technique, if the MIMO technique selected for the UE according to the above Steps 1 to 4 is the precoding based closed-loop space multiplexing technique or the layer=1 closed-loop precoding technique, then the base station switches the MIMO technique adopted to transmit the data of the UE to the precoding based closed-loop space multiplexing technique or the layer=1 closed-loop precoding technique.

In addition, if the MIMO technique selected for the UE according to the above Steps 1 to 4 is the same as that adopted by the base station to transmit the data of the UE currently, the base station still adopts the current MIMO technique to transmit the data of the UE and does not carry out handover.

The decision algorithm adopted by the downlink transmission method for the MIMO system in the above preferable embodiment is simple and of low complexity. The process of adaptively selecting one MIMO technique from multiple MIMO techniques (handing over to one MIMO technique of multiple MIMO techniques) in the downlink transmission mode basically can increase the capacity of the LTE system to the maximum whatever channel state the UE is in, and this method is easy to be extended to the selection and handover of MIMO techniques in other wireless communication systems.

In addition, the CQI, RI and PMI information reported by the UE is used to obtain the channel SINR parameter, the channel correlation parameter and the channel variation state parameter, so as to determine the wireless channel type in which the UE is and hereby to adaptively determine the downlink MIMO mode most suitable for the UE. This algorithm mainly uses the feedback information regulated in the existing protocol, thereby increasing the system throughput as much as possible without apparently increasing the operation complexity, thus this algorithm is beneficial to project implementation.

Figure 2:
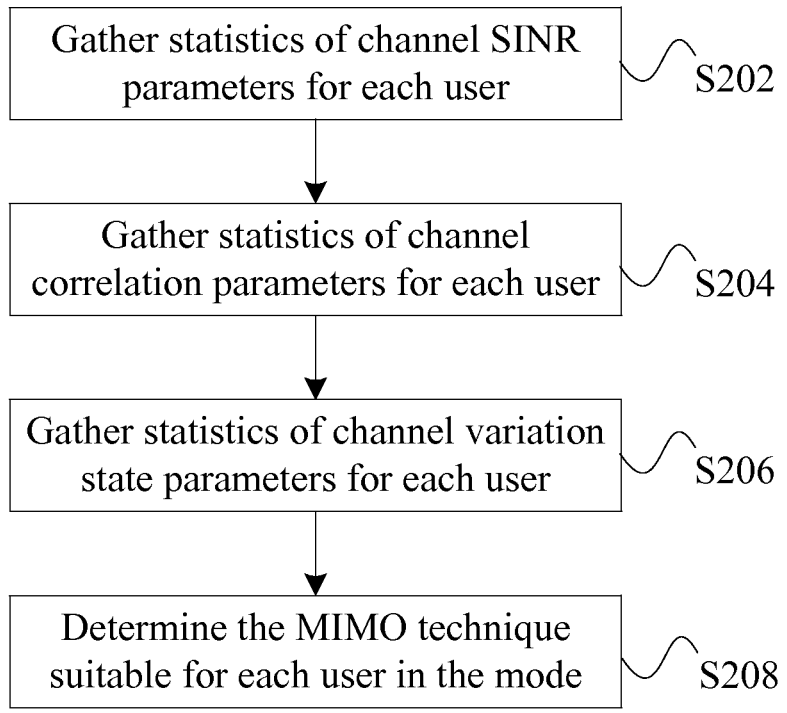
FIG. 2 shows a flowchart of a downlink transmission method for an MIMO system according to a preferable embodiment of the disclosure.

As shown in FIG. 2, during a specific implementation process, according to the regulation in the LTE protocol, the intra-downlink transmission mode handover (selection) of the user is implemented through MAC signalling interaction, thus the time interval of the handover process is milliseconds; therefore, the value of the above time window T can be obtained according to simulation and test and it is suggested to set the value of the time window T to be 30 ms. The specific selection method comprises the following steps:

Step S202: gather statistics of the CQIs reported by each UE within the time window T, and obtain the channel SINR parameter flag$^{CQI}$ according to the CQI decision threshold.

Taking the $k^{th}$ UE for example, the mean value $CQI_k$ of the CQIs reported last M times is calculated according to the following formula:

$$CQI_k = E\left\{\min_{1 \leq m \leq M}(CQI_1(m), CQI_2(m))\right\} \quad (1)$$

wherein when the UE feeds back a single-flow CQI the $m^{th}$ time, the value of the single-flow CQI is assigned to $CQI_1(m)$ and make $CQI_2(m)=16$; M is a constant and the value of M can be determined according to simulation and test values, it is suggested to set the value of M to be 4.

Then, according to the CQI decision threshold CQI_Thr, the flag$^{CQI}(k)$ of the $k^{th}$ UE is calculated according to the following formula:

$$flag^{CQI}(k) = \begin{cases} 1 & CQI_k > \text{CQI\_Thr} \\ 0 & CQI_k \leq \text{CQI\_Thr} \end{cases} \quad (2)$$

wherein the decision threshold CQI_Thr can be determined according to simulation and test values, it is suggested to set the value to be 5. In the formula (2) above, the first value takes a value of 1 and the second value takes a value of 0.

Step S204: gather statistics of the RIs reported by each UE within the time window T, and obtain the channel correlation parameter flag$^{RI}$ according to the RI decision threshold; if no RI is reported in part downlink transmission modes, then make flag$^{RI}=0$.

Taking the $k^{th}$ UE for example, when each time window T starts, $Num^k_{RI}=0$, when the base station receives RI=1 fed back by the $k^{th}$ UE, $Num^k_{RI=1}=Num^k_{RI=1}+1$, then, $$\begin{cases} P^k_{RI=1} & \dfrac{Num^k_{RI=1}}{Num^k_{total\_RI}} \\ P^k_{RI \geq 2} & \dfrac{Num^k_{total\_RI} - Num^k_{RI=1}}{Num^k_{total\_RI}} \end{cases} \quad (3)$$

wherein $Num^k_{total\_RI}$ is the total number of RIs reported by the $k^{th}$ UE within the time window T, $P^k_{RI=1}$ is the probability of RI=1 reported by the $k^{th}$ UE within the time window T, $P^k_{RI \geq 2}$ is the probability of RI 2 reported by the $k^{th}$ UE within the time window T.

Then, according to the RI decision threshold RI_Thr, the channel correlation parameter flag$^{RI}(k)$ of the $k^{th}$ UE is calculated according to the following formula:

$$flag^{RI}(k) = \begin{cases} 1 & P^k_{RI=1} > \text{RI\_Thr} \\ 2 & P^k_{RI \geq 2} > \text{RI\_Thr} \\ 0 & \text{others} \end{cases} \quad (4)$$

wherein the value of the RI decision threshold RI_Thr can be determined according to simulation and test values, 1>RI_Thr>0.5, it is suggested to set the value to be 0.55. In the formula (4), the third value takes a value of 1, the fourth value takes a value of 2 and the fifth value takes a value of 0.

Step S206: gather statistics of the PMI variations reported by each UE within the time window T, and obtain the channel variation state parameter flag$^{PMI}$ according to the decision threshold PMI_Thr of channel variation characteristics; if no RI is reported in part modes, then make flag$^{PMI}$=0.

Taking the k$^{th}$ UE for example, when each time window T starts, Num$^k_{PMI}$=0, when two PMI values received by the base station and reported continuously by the k$^{th}$ UE are different, Num$^k_{PMI}$=Num$^k_{PMI}$ then $$P^k_{PMI} \frac{Num^k_{PMI}}{Num^k_{total\_PMI}} \quad (5)$$

wherein Num$^k_{total\_PMI}$ is the total number of the PMIs reported by the k$^{th}$ UE within the time window T, P$^k_{PMI}$ is the probability that two PMI values reported continuously by the UE within the time window are different.

Then, according to the decision threshold PMI_Thr of channel variation characteristics, the channel variation state parameter flag$^{PMI}$(k) of the k$^{th}$ UE is calculated according to the following formula:

$$flag^{PMI}(k) = \begin{cases} 1 & P^k_{PMI} \leq PMI\_Thr \\ 0 & others \end{cases} \quad (6)$$

wherein the value of the decision threshold PMI_Thr of channel variation characteristics can be determined according to simulation and test values, 1>PMI_Thr>0, it is suggested to set the value to be 0.3. In the formula (6), the seventh value takes a value of 1 and the eighth value takes a value of 0.

Step S208: according to the parameters (comprising flag$^{CQI}$(k), flag$^{RI}$(k), flag$^{PMI}$(k)) corresponding to each UE obtained in the above Steps S202 to S206, adaptively select, for each UE, different downlink MIMO modes in the downlink transmission mode in which the UE is, so as to accomplish the adaptive selection (handover) process in the downlink transmission mode.

Hereinafter taking the transmission mode 4 for example, it is regulated in the LTE protocol that the MIMO techniques supported in the downlink transmission mode 4 comprise precoding based closed-loop space multiplexing, Rank=1 closed-loop precoding and transmission diversity, then the corresponding parameters of each UE are obtained according to the above steps and one of the three different downlink MIMO modes to which the UE adaptively switches is determined.

Stilling taking the k$^{th}$ user for example:

① when flag$^{RI}$(k)=2 && flag$^{CIR}$(k)=1 && flag$^{PMI}$(k)=1 are satisfied, the characteristics of the wireless channel in which the UE currently is are suitable to adopt the precoding based closed-loop space multiplexing technique;

② when flag$^{RI}$(k)=1&& flag$^{PMI}$(k)=1 are satisfied, characteristics of the wireless channel in which the UE currently is are suitable to adopt the Rank=1 closed-loop precoding technique;

③ in conditions other than the above conditions, the characteristics of the wireless channel in which the UE currently is are suitable to adopt the transmission diversity technique.

Figure 3:
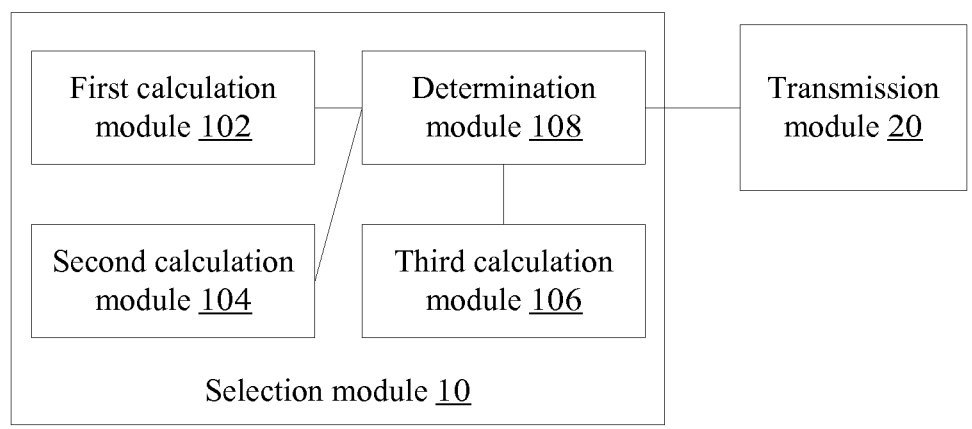
FIG. 3 shows a diagram of a base station according to an embodiment of the disclosure.

FIG. 3 shows a diagram of a base station according to an embodiment of the disclosure, which comprises: a selection module 10, which is configured to select one downlink MIMO mode in a downlink transmission mode in which a UE currently is by using a CQI, an RI and a PMI which are reported by the UE within a time window (T); and a transmission module 20, which is configured to transmit data to the UE by using the selected downlink MIMO mode.

Preferably, the selection module 10 comprises: a first calculation module 102, which is configured to calculate a channel SINR parameter of the UE by using the CQI that is reported by the UE within the time window; a second calculation module 104, which is configured to calculate a channel correlation parameter of the UE by using the RI that is reported by the UE within the time window; a third calculation module 106, which is configured to calculate a channel variation state parameter of the UE by using the PMI that is reported by the UE within the time window; and a determination module 108, which is configured to determine the downlink MIMO mode in the downlink transmission mode in which the UE currently is according to the channel SINR parameter, the channel correlation parameter and the channel variation state parameter of the UE.

Preferably, the channel SINR parameter of the UE calculated by the first calculation module 102 is:

$$flag^{CQI} = \begin{cases} a \text{ first value,} & CQI > CQI\_Thr \\ a \text{ second value,} & CQI \leq CQI\_Thr, \end{cases}$$

wherein flag$^{CQI}$ is the channel SINR parameter of the UE, CQI_Thr is a decision threshold of the CQI and CQI is a mean value of CQIs reported last M times by the UE within the time window, M is a constant, $$CQI = E\left\{\min_{1 \leq m \leq M}(CQI_1(m), CQI_2(m))\right\},$$

m is a variable, CQI$_1$(m) is a CQI value of a single flow or the first flow of two flows and CQI$_2$(m) is a CQI value of the second flow of the two flows, if the CQI reported the m$^{th}$ time by the UE is a single-flow CQI, CQI$_2$(m)=16.

Preferably, the channel correlation parameter of the UE calculated by the second calculation module 104 is:

$$flag^{RI} = \begin{cases} a \text{ third value,} & P_{RI=1} > RI\_Thr \\ a \text{ fourth value,} & P_{RI \geq 2} > RI\_Thr \\ a \text{ fifth value,} & others, \end{cases}$$

wherein flag$^{RI}$ is the channel correlation parameter of the UE, P$_{RI=1}$ is a probability of RI=1 reported by the UE within the time window, P$_{RI \geq 2}$ is a probability of RI≥2 reported by the UE within the time window and RI_Thr is a decision threshold of the RI.

Preferably, if the UE does not report the RI, the channel correlation parameter of the UE is marked as 0 by the second calculation module 104.

Preferably, the channel variation state parameter of the UE calculated by the third calculation module 106 is:

$$flag^{PMI} = \begin{cases} a \text{ seventh value,} & P_{PMI} \leq PMI\_Thr \\ an \text{ eighth value,} & others, \end{cases}$$

wherein flag$^{PMI}$ is the channel variation state parameter of the UE, $P_{PMI}$ is a probability that two PMI values reported continuously by the UE within the time window are different and PMI_Thr is a decision threshold of channel variation characteristics.

Preferably, if the UE does not report the PMI, the channel variation state parameter of the UE is marked as 0 by the third calculation module 106.

Preferably, the determination module 108 comprises: a first selection module, which is configured to select a precoding based closed-loop space multiplexing technique as the downlink MIMO mode, if the value of the channel SINR parameter is the first value, the value of the channel correlation parameter is the fourth value and the value of the channel variation state parameter is the seventh value, and the UE is in the downlink transmission mode 4 currently; a second selection module, which is configured to select a precoding based open-loop space multiplexing technique as the downlink MIMO mode, if the value of the channel SINR parameter is the first value, the value of the channel correlation parameter is the fourth value and the value of the channel variation state parameter is the eighth value, and the UE is in the downlink transmission mode 3 currently; a third selection module, which is configured to select a layer=1 closed-loop precoding technique as the downlink MIMO mode, if the value of the channel correlation parameter is the third value and the value of the channel variation state parameter is the seventh value, and the UE is in the downlink transmission mode 4 or 6 currently; a fourth selection module, which is configured to select a beam-forming technique as the downlink MIMO mode, if the value of the channel correlation parameter is the third value and the value of the channel variation state parameter is the seventh value, and the UE is in the downlink transmission mode 7 currently; and a fifth selection module, which is configured to select a transmission diversity technique in the downlink transmission mode in which the UE currently is as the downlink MIMO mode, in conditions other than the above conditions.

In the preferable embodiments above, the base station uses the CQI and RI information reported by the UE or related values of impulse response data of an uplink channel between two adjacent time slots to obtain various parameters, thereby improving the reliability of the decision algorithm; moreover, the base station is suitable for LTE Frequency Division Duplex (FDD) and Time Division Duplex (TDD) systems; the operation complexity is not increased while the performance of the algorithm is ensured, it is very beneficial to project implementation; and the adaptive algorithm is suitable for various different channel environments.

From the description above, it can be seen that the disclosure achieves the following technique effects:

(1) by taking the advantage of the regulation in the LTE system protocol, according to the CQI, RI and PMI information reported by the UE, all kinds of corresponding parameters are obtained, thus the reliability of the decision algorithm for realizing the selection of MIMO techniques in the downlink transmission mode is improved;

(2) the disclosure is suitable for LTE FDD and TDD systems; the operation complexity is not increased while the precision of the decision result is ensured; and the disclosure is beneficial to project implementation; and (3) the adaptive method can suit various different channel environments, so that the capacity of the LTE system can be increased to the maximum whatever channel state the UE is in.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A downlink transmission method for a Multiple Input Multiple Output (MIMO) system, the method comprising:
    selecting, by a base station, one downlink MIMO mode in a downlink transmission mode in which a User Equipment (UE) currently is, by using a Channel Quality Indicator (CQI), a Rank Indicator (RI) and a Preceding Matrix Indicator (PMI), which are reported by the UE within a time window; and
    transmitting, by the base station, data to the UE by using the selected downlink MIMO mode;
    wherein selecting the downlink MIMO mode in the downlink transmission mode in which the UE currently is, by using the CQI, the RI and the PMI, which are reported by the UE within the time window comprises: calculating a channel Signal Interference Noise Ratio (SINR) parameter of the UE by using the CQI that is reported by the UE within the time window; calculating a channel correlation parameter of the UE by using the RI that is reported by the UE within the time window; calculating a channel variation state parameter of the UE by using the PMI that is reported by the UE within the time window; and determining the downlink MIMO mode in the downlink transmission mode in which the UE currently is according to the channel SINR parameter, the channel correlation parameter and the channel variation state parameter of the UE;
    wherein determining the downlink MIMO mode in the downlink transmission mode in which the UE currently is according to the channel SINR parameter, the channel correlation parameter and the channel variation state parameter of the UE comprises:
        if a value of the channel SINR parameter is a first value, a value of the channel correlation parameter is a fourth value and a value of the channel variation state parameter is a seventh value, and the UE is in a downlink transmission mode 4 currently, then selecting a precoding based closed-loop space multiplexing technique as the downlink MIMO mode;
        if the value of the channel SINR parameter is the first value, the value of the channel correlation parameter is the fourth value and the value of the channel variation state parameter is an eighth value, and the UE is in a downlink transmission mode 3 currently, then selecting a precoding based open-loop space multiplexing technique as the downlink MIMO mode;
        if the value of the channel correlation parameter is a third value, the value of the channel variation state parameter is the seventh value, and the UE is in a downlink transmission mode 4 or 6 currently, then selecting a layer=1 closed-loop precoding technique as the downlink MIMO mode;

if the value of the channel correlation parameter is the third value, the value of the channel variation state parameter is the seventh value, and the UE is in a downlink transmission mode 7 currently, then selecting a beam-forming technique as the downlink MIMO mode; otherwise, then selecting a transmission diversity technique in the downlink transmission mode, in which the UE currently is, as the downlink MIMO mode.

2. The method according to claim 1, wherein calculating the channel SINR parameter of the UE by using the CQI which is reported by the UE within the time window comprises:

$$flag^{CQI} = \begin{cases} \text{a first value,} & CQI > CQI\_Thr \\ \text{a second value,} & CQI \leq CQI\_Thr \end{cases}$$

wherein $flag^{CQI}$ is the channel SINR parameter of the UE, CQI_Thr is a decision threshold of the CQI and CQI is a mean value of CQIs reported last M times by the UE within the time window, M is a constant, $$CQI = E\left\{\min_{1 \leq m \leq M}(CQI_1(m), CQI_2(m))\right\},$$

m is a variable, $CQ_1$ (m) is a CQI value of a single flow or the first flow of two flows and $CQI_2(m)$ is a CQI value of the second flow of the two flows, if the CQI reported the $m^{th}$ time by the UE is a single-flow CQI, $CQI_2(m)=16$.

3. The method according to claim 1, wherein calculating the channel correlation parameter of the UE by using the RI which is reported by the UE within the time window comprises:

$$flag^{RI} = \begin{cases} \text{a third value,} & P_{RI=1} > RI\_Thr \\ \text{a fourth value,} & P_{RI \geq 2} > RI\_Thr \\ \text{a fifth value,} & \text{others} \end{cases}$$

wherein $flag^{RI}$ is the channel correlation parameter of the UE, $P_{RI=1}$ is a probability of RI=1 reported by the UE within the time window, $P_{R>2}$ is a probability of RI>2 reported by the UE within the time window and RI_Thr is a decision threshold of the RI.

4. The method according to claim 1, wherein if the UE does not report the RI, then the channel correlation parameter of the UE is 0.

5. The method according to claim 1, wherein calculating the channel variation state parameter of the UE by using the PMI which is reported by the UE within the time window comprises:

$$flag^{PMI} = \begin{cases} \text{a seventh value,} & P_{PMI} \leq PMI\_Thr \\ \text{an eighth value,} & \text{others} \end{cases}$$

wherein $flag^{PMI}$ is the channel variation state parameter of the UE, $P_{PMI}$ is a probability that two PMI values reported continuously by the UE within the time window are different and PMI_Thr is a decision threshold of channel variation characteristics.

6. The method according to claim 1, wherein if the UE does not report the PMI, then the channel variation state parameter of the UE is 0.

7. A base station, comprising:
a selection module, which is configured to select one downlink Multiple Input Multiple Output (MIMO) mode in a downlink transmission mode in which a User Equipment (UE) currently is, by using a Channel Quality Indicator (CQI), a Rank Indicator (RI) and a Preceding Matrix Indicator (PMI), which are reported by the UE within a time window; and
a transmission module, which is configured to transmit data to the UE by using the selected downlink MIMO mode;
wherein the selection module comprises:
a first calculation module, which is configured to calculate a channel Signal Interference Noise Ratio (SINR) parameter of the UE by using the CQI that is reported by the UE within the time window;
a second calculation module, which is configured to calculate a channel correlation parameter of the UE by using the RI that is reported by the UE within the time window;
a third calculation module, which is configured to calculate a channel variation state parameter of the UE by using the PMI that is reported by the UE within the time window; and
a determination module, which is configured to determine the downlink MIMO mode in the downlink transmission mode in which the UE currently is according to the channel SINR parameter, the channel correlation parameter and the channel variation state parameter of the UE;
wherein the determination module, which is configured to determine the downlink MIMO mode in the downlink transmission mode in which the UE currently is according to the channel SINR parameter, the channel correlation parameter and the channel variation state parameter of the UE comprises:
if a value of the channel SINR parameter is a first value, a value of the channel correlation parameter is a fourth value and a value of the channel variation state parameter is a seventh value, and the UE is in a downlink transmission mode 4 currently, then the determination module is configured to select a precoding based closed-loop space multiplexing technique as the downlink MIMO mode;
if the value of the channel SINR parameter is the first value, the value of the channel correlation parameter is the fourth value and the value of the channel variation state parameter is an eighth value, and the UE is in a downlink transmission mode 3 currently, then the determination module is configured to select a precoding based open-loop space multiplexing technique as the downlink MIMO mode;
if the value of the channel correlation parameter is a third value, the value of the channel variation state parameter is the seventh value, and the UE is in a downlink transmission mode 4 or 6 currently, then the determination module is configured to select a layer=1 closed-loop precoding technique as the downlink MIMO mode;

if the value of the channel correlation parameter is the third value, the value of the channel variation state parameter is the seventh value, and the UE is in a downlink transmission mode 7 currently, then the determination module is configured to select a beamforming technique as the downlink MIMO mode;

otherwise, then the determination module is configured to select a transmission diversity technique in the downlink transmission mode in which the UE currently is as the downlink MIMO mode.

* * * * *